US009952040B2

United States Patent
Kodaira (10) Patent No.: US 9,952,040 B2
(45) Date of Patent: Apr. 24, 2018

(54) TILT DETECTING DEVICE AND ROTARY LASER APPARATUS

(71) Applicant: Kabushiki Kaisha TOPCON, Tokyo-to (JP)

(72) Inventor: Jun-ichi Kodaira, Tokyo-to (JP)

(73) Assignee: Kabushiki Kaisha TOPCON, Tokyo-to (JP)

( * ) Notice: Subject to any disclaimer, the term of this patent is extended or adjusted under 35 U.S.C. 154(b) by 59 days.

(21) Appl. No.: 14/945,482

(22) Filed: Nov. 19, 2015

(65) Prior Publication Data

US 2016/0153774 A1    Jun. 2, 2016

(30) Foreign Application Priority Data

Nov. 27, 2014   (JP) .................. 2014-240126

(51) Int. Cl.
| | | |
|---|---|---|
| *G01C 1/00* | (2006.01) | |
| *G01B 11/26* | (2006.01) | |
| *G01C 15/00* | (2006.01) | |
| *G01D 5/34* | (2006.01) | |

(Continued)

(52) U.S. Cl.
CPC ............ *G01B 11/26* (2013.01); *G01C 15/002* (2013.01); *G01D 5/344* (2013.01); *G01M 11/08* (2013.01); *G03B 21/2046* (2013.01); *G03B 21/2073* (2013.01)

(58) Field of Classification Search
CPC ...... G01B 11/26; G01C 15/002; G01D 5/344; G01M 11/08; G03B 21/2046; G03B 21/2073
See application file for complete search history.

(56) References Cited

U.S. PATENT DOCUMENTS

| | | | |
|---|---|---|---|
| 5,636,018 A | 6/1997 | Hirano et al. | |
| 5,774,211 A * | 6/1998 | Ohtomo ............... | G01C 15/002 356/141.2 |
| 2013/0155224 A1* | 6/2013 | Ohtomo ................ | G01B 11/26 348/136 |

FOREIGN PATENT DOCUMENTS

| | | |
|---|---|---|
| EP | 2607847 A2 | 6/2013 |
| JP | 2000-266545 A | 9/2000 |
| JP | 2003-28640 A | 1/2003 |

OTHER PUBLICATIONS

European communication dated Apr. 26, 2016 in corresponding European patent application No. 15195539.0.

* cited by examiner

*Primary Examiner* — Jamil Ahmed
(74) *Attorney, Agent, or Firm* — Nields, Lemack & Frame, LLC (57) ABSTRACT

The invention provides a tilt detecting device, in which a fixed member and a tilting plate are relatively rotatably provided via a pivot member, either one of the fixed member or the tilting plate is integral with the pivot member, comprising a tilt detecting unit provided on either of the fixed member or the tilting plate which relatively rotates with respect to the pivot member, and an angle detection pattern formed on the pivot member, wherein the tilt detecting unit comprises a light source for projecting an illumination light to the pivot member, a photodetection element for receiving the illumination light reflected by the pivot member, an optical system for projecting a pattern image to the photodetection element and an arithmetic unit for detecting a rotation of the pivot member based on a projecting position of the pattern image projected onto the photodetection element when the pivot member rotates.

4 Claims, 4 Drawing Sheets

(51) Int. Cl.
*G01M 11/08* (2006.01)
*G03B 21/20* (2006.01)

FIG.5 a
TILT DETECTING DEVICE AND ROTARY LASER APPARATUS

BACKGROUND OF THE INVENTION

The present invention relates to a tilt detecting device and a rotary laser apparatus which is capable of detecting a tilt based on a pattern.

As a tilt detecting means for use in a tilt detecting device, an encoder such as a linear encoder or a circle encoder or the like is extensively used.

However, in order to make a tilt detection accuracy more accurate, a size of the encoder must be increased. Further, since a portion with a large moving amount must be determined as a detection target, an increase in size of a device itself is unavoidable. Therefore, it had been difficult to achieve both a miniaturization of the device and the improvement of the tilt detection accuracy.

SUMMARY OF THE INVENTION

It is an object of the present invention to provide a tilt detecting device and a rotary laser apparatus, which can achieve a miniaturization.

To attain the object as described above, a tilt detecting device according to the present invention, in which a fixed member and a tilting plate are relatively rotatably provided via a pivot member, either one of the fixed member or the tilting plate is integral with the pivot member, comprising a tilt detecting unit provided on either of the fixed member or the tilting plate which relatively rotates with respect to the pivot member, and an angle detection pattern formed on the pivot member, wherein the tilt detecting unit comprises a light source for projecting an illumination light to the pivot member, a photodetection element for receiving the illumination light reflected by the pivot member, an optical system for projecting a pattern image to the photodetection element and an arithmetic unit for detecting a rotation of the pivot member based on a projecting position of the pattern image projected onto the photodetection element when the pivot member rotates.

Further, in the tilt detecting device according to the present invention, the optical system comprises a polarizing plate disposed on an optical axis, a polarizing beam splitter and a quarter-wave plate, wherein the illumination light is projected to the pivot member via the polarizing plate, the polarizing beam splitter and the quarter-wave plate, and the pattern image reflected by the pivot member is received by the photodetection element via the quarter-wave plate and the polarizing beam splitter.

Further, in the tilt detecting device according to the present invention, the polarizing plate is a polarizing film formed on an incident surface of the polarizing beam splitter and the quarter-wave plate is a quarter-wave film formed on an exit surface of the polarizing beam splitter.

Furthermore, a rotary laser apparatus according to the present invention comprises a laser projector tiltably provided, deflecting a laser beam in a horizontal direction and projecting in rotary irradiation, a tilting unit for tilting the laser projector, and a tilt setting unit for setting a target tilt angle of the laser projector, wherein the tilt setting unit comprises a base plate orthogonal to an axis of the laser projector, a tilting plate provided tiltably with respect to the base plate via a pivot member, a tilt detector provided on the tilting plate for detecting a horizontality of the tilting plate, an angle detection pattern formed on the pivot member, and the tilt detecting unit as described in claim 1 provided on the tilting plate.

According to the present invention, the tilt detecting device, in which a fixed member and a tilting plate are relatively rotatably provided via a pivot member, either one of the fixed member or the tilting plate is integral with the pivot member, comprising a tilt detecting unit provided on either of the fixed member or the tilting plate which relatively rotates with respect to the pivot member, and an angle detection pattern formed on the pivot member, wherein the tilt detecting unit comprises a light source for projecting an illumination light to the pivot member, a photodetection element for receiving the illumination light reflected by the pivot member, an optical system for projecting a pattern image to the photodetection element and an arithmetic unit for detecting a rotation of the pivot member based on a projecting position of the pattern image projected onto the photodetection element when the pivot member rotates. As a result, a moving amount of the angle detection pattern is slight compared to a moving amount of the tilting plate, which contribute to a miniaturization of the photodetection element which receives the pattern image, a reduction in size and cost and the highly accurate detection of a tilt angle of the tilting plate.

Further, according to the present invention, in the tilt detecting device, the optical system comprises a polarizing plate disposed on an optical axis, a polarizing beam splitter and a quarter-wave plate, wherein the illumination light is projected to the pivot member via the polarizing plate, the polarizing beam splitter and the quarter-wave plate, and the pattern image reflected by the pivot member is received by the photodetection element via the quarter-wave plate and the polarizing beam splitter. As a result, the pattern image is not reflected to the light source side, the illumination light from the light source is not received by the photodetection element and a tilt detecting operation of the tilting plate can be stabilized.

Further, according to the present invention, in the tilt detecting device, the polarizing plate is a polarizing film formed on an incident surface of the polarizing beam splitter and the quarter-wave plate is a quarter-wave film formed on an exit surface of the polarizing beam splitter. As a result, numbers of the components are reduced and a further miniaturization can be realized.

Furthermore, according to the present invention, the rotary laser apparatus comprises a laser projector tiltably provided, deflecting a laser beam in a horizontal direction and projecting in rotary irradiation, a tilting unit for tilting the laser projector, and a tilt setting unit for setting a target tilt angle of the laser projector, wherein the tilt setting unit comprises a base plate orthogonal to an axis of the laser projector, a tilting plate provided tiltably with respect to the base plate via a pivot member, a tilt detector provided on the tilting plate for detecting a horizontality of the tilting plate, an angle detection pattern formed on the pivot member, and the tilt detecting unit as described in claim 1 provided on the tilting plate. As a result, it is not necessary to provide a mechanism for detecting a tilt of the tilting plate, the number of the components are reduced, which contribute to a miniaturization.

DETAILED DESCRIPTION OF THE PREFERRED EMBODIMENT

A description will be given below on embodiments of the present invention by referring to the attached drawings.

First, referring to FIG. 1, a description will be given on a tilt detecting device according to a first embodiment of the present invention.

Figure 1:
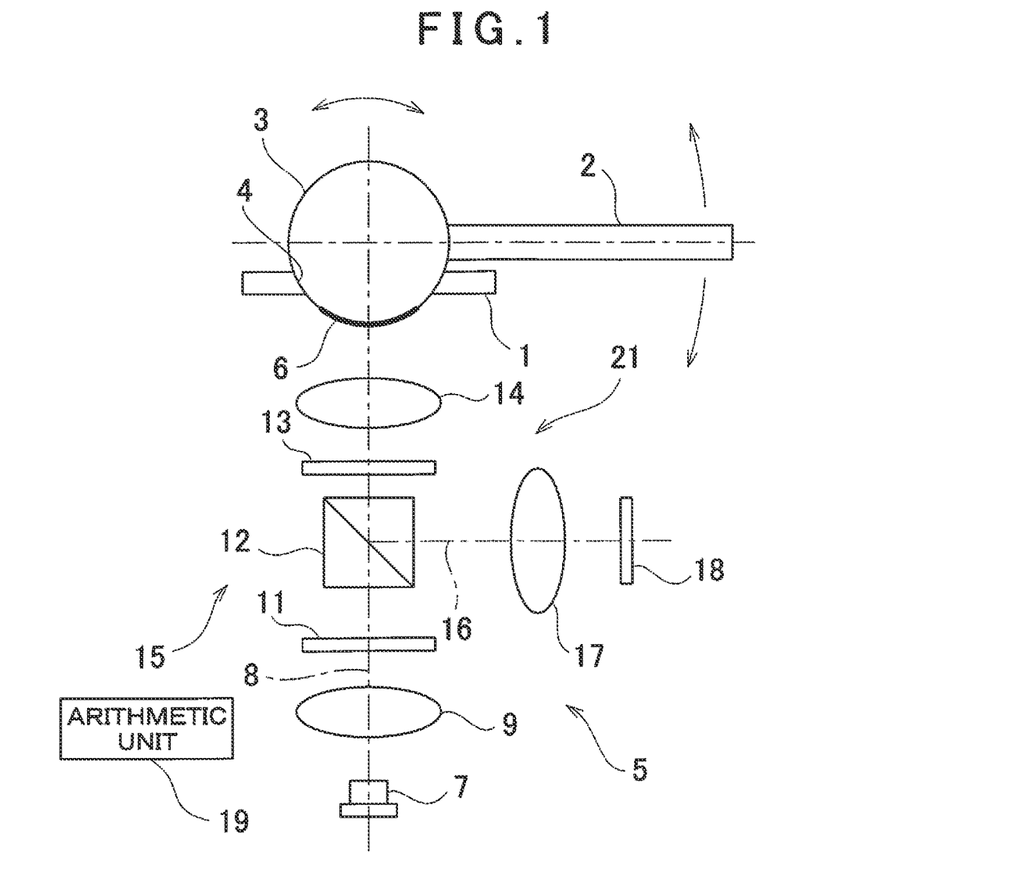
FIG. 1 is a schematical block diagram which show a tilt detecting device according to a first embodiment of the present invention.

In FIG. 1, reference numeral 1 denotes a base plate as a fixed member and a part of the base plate 1 is shown in FIG. 1. Reference numeral 2 denotes a tilting plate as a movable part and the tilting plate 2 can be tilted with respect to the base plate 1, and in FIG. 1, one part of the tilting plate 2 is shown. The tilting plate 2 is provided so as to rotate integrally with a pivot member 3 and can relatively tilt with respect to the base plate 1.

The pivot member 3 is a sphere, and a hole is provided in the base plate 1. A peripheral surface of the hole is a spherical surface so that the pivot member 3 can be fitted therein, and the hole functions as a spherical seat 4 of the pivot member 3. Further, the pivot member 3 can be rotatably fitted on the spherical seat 4 and the tilting plate 2 rotates around the pivot member 3 as a supporting point. Further, when the pivot member 3 is fitted on the spherical seat 4, a part of a lower portion of the pivot member 3 is adapted to be exposed to a lower side.

The tilt detecting device is for detecting a relative tilt between the base plate 1 and the pivot member 3. The tilt detecting device is constituted of a tilt detecting unit 5 provided on the base plate 1 and an angle detection pattern 6 formed on the pivot member 3.

A description will be given below on the tilt detecting unit 5.

A light source 7 which emits an illumination light, e.g. an LED, is provided in a vertically upward direction. A projection lens 9, a polarizing plate 11, a polarizing beam splitter 12, a quarter-wave plate 13, a condenser lens 14 and the angle detection pattern 6 are disposed on a projection optical axis 8 of the light source 7. Further, the projection optical axis 8 is set so as to pass through a center of the pivot member 3.

The polarizing plate 11 has an optical characteristic of turning an illumination light emitted from the light source 7, for instance, to an illumination light which is a P-polarized light, for instance. The polarizing beam splitter 12 has a polarization characteristic of allowing the light, which is the P-polarized light, to pass through and of reflecting the light which is the S-polarized light, for instance.

The light source 7, the projection lens 9, the polarizing plate 11, the polarizing beam splitter 12, the quarter-wave plate 13 and the condenser lens 14 make up a projecting optical system 15.

A focus lens 17 and a photodetection element 18 which is a two-dimensional sensor are disposed on a reflection optical axis 16 of The polarizing beam splitter 12. As the photodetection element 18, a profile sensor which is an aggregate of pixels is used, for instance.

In the profile sensor, the pixels are aligned in a matrix state and a position of an object in the profile sensor can be detected by only informations of each column, which the pixels belong, of two directions (an X direction, a Y direction) orthogonal to each other. Therefore, the profile sensor can easily detect a position of the object in the profile sensor without acquiring the information of all the pixels.

It is to be noted that a CCD or a CMOS sensor may be used as the photodetection element 18, information of all the pixels may be acquired and a position of the object on the photodetection element 18 may be detected.

The photodetection element 18 outputs a photodetection signal to an arithmetic unit 19 and the arithmetic unit 19 calculates the position of the object based on the photodetection signal. Further, the arithmetic unit 19 calculates a displacement and a displacement direction of a position of the object, and detects a tilt angle and a tilt direction of the tilting plate 2 based on a calculation result.

The condenser lens 14, the quarter-wave plate 13, the polarizing beam splitter 12, the focus lens 17 and the photodetection element 18 make up a photodetection optical system 21. Further, the polarizing plate 11 and the quarter-wave plate 13 make up an optical isolator.

Next, a description will be given on the angle detection pattern 6. The angle detection pattern 6 is formed on a lower surface of the pivot member 3 by a required method such as printing or engraving or the like.

Figure 2:
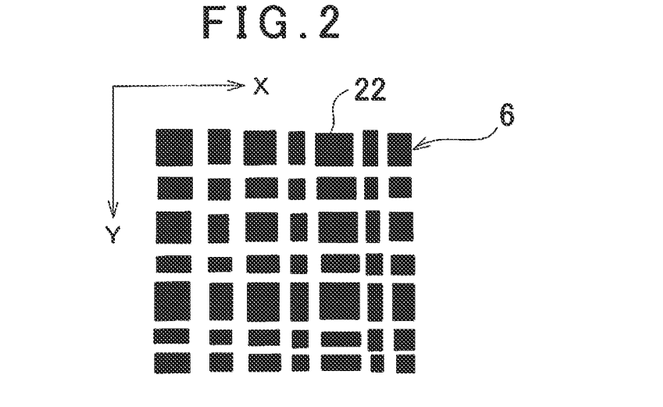
FIG. 2 is an explanatory drawing for explaining an angle detention pattern formed on a pivot member of the tilt detecting device.

For instance, as shown in FIG. 2, the angle detection pattern 6 has lands 22 arranged an a matrix fashion. Each land 22 has a different dimension in an X direction respectively and each land has a different dimension in a Y direction respectively. Therefore, the angle detection pattern 6 is configured so as to include a two-dimensional information of the X direction and the Y direction.

The illumination light emitted from the light source 7 is turned to a parallel luminous flux by the projection lens 9, turned to the P-polarized light, for instance, in a process of passing through the polarizing plate 11 and transmitted through the polarizing beam splitter 12. The illumination light, as transmitted through the polarizing beam splitter 12 passes through the quarter-wave plate 13, is condensed by the condenser lens 14 and enters the lower surface of the pivot member 3, i.e. the angle detection pattern 6.

The reflection light reflected on the lower surface of the pivot member 3, i.e. a pattern image of the angle detection pattern 6, passes through the quarter-wave plate 13 again and is reflected by the polarizing beam splitter 12. By the illumination light passing through the quarter-wave plate 13 twice, the P-polarized Light is changed to the S-polarized light.

An illumination light of the S-polarized light is reflected by the polarizing beam splitter 12, and condensed on the photodetection element 18 by the focus lens 17. Therefore, the condenser lens 14 and the focus lens 17 function as focus lenses for projecting the angle detection pattern 6 onto the photodetection element 18.

It is to be noted that, as the focus lens 17, a lens with high magnification such as a semi-spherical lens may be used. When a refractive power which enables forming an image on the photodetection element 18 is provided to the focus lens 17 alone, the condenser lens 14 can be omitted.

When the tilting plate 2 tilts and the pivot member 3 relatively rotates with respect to the tilt detecting unit 5, the angle detection pattern 6 is relatively displaced with respect to the base plate 1, i.e. the tilt detecting unit 5. When the angle detection pattern 6 is displaced, a projecting position of a pattern image of the angle detection pattern 6, which is received by the photodetection element 18, changes. The arithmetic unit 19 calculates a displacement of the projecting position based on a photodetection signal from the photodetection element 18 and is capable of detecting a tilt of the tilting plate 2 based on a calculation result.

It is to be noted that the tilt of the tilting plate 2 may be detected based on a moving amount or a moving direction of the position of the pattern image on the photodetection element 18 after the tilt with respect to the position of the pattern image on the photodetection element 18 before the tilt. Further, a coordinate system and an origin point may be set on the photodetection element 18 and the tilt of the tilting plate 2 may be detected based on the position of the pattern image on the photodetection element 18 with respect to the origin point of the coordinate system.

The pivot member 3 has no restriction in its rotating direction and can freely rotate in two directions of X and Y, and the photodetection element 18 can detect a two-dimensional displacement of the angle detection pattern 6. Therefore, as the tilting directions in the tilt detecting device, the X direction, the Y direction, and a composite direction of X and. Y can be detected, respectively.

When a driving unit for tilting the tilting plate 2 is provided on a movable part, i.e. the tilting plate 2, the tilting plate 2 is capable of being tilted at an arbitrary tilt angle by she driving unit based on a tilt detection result of the tilt detecting device.

Figure 3:
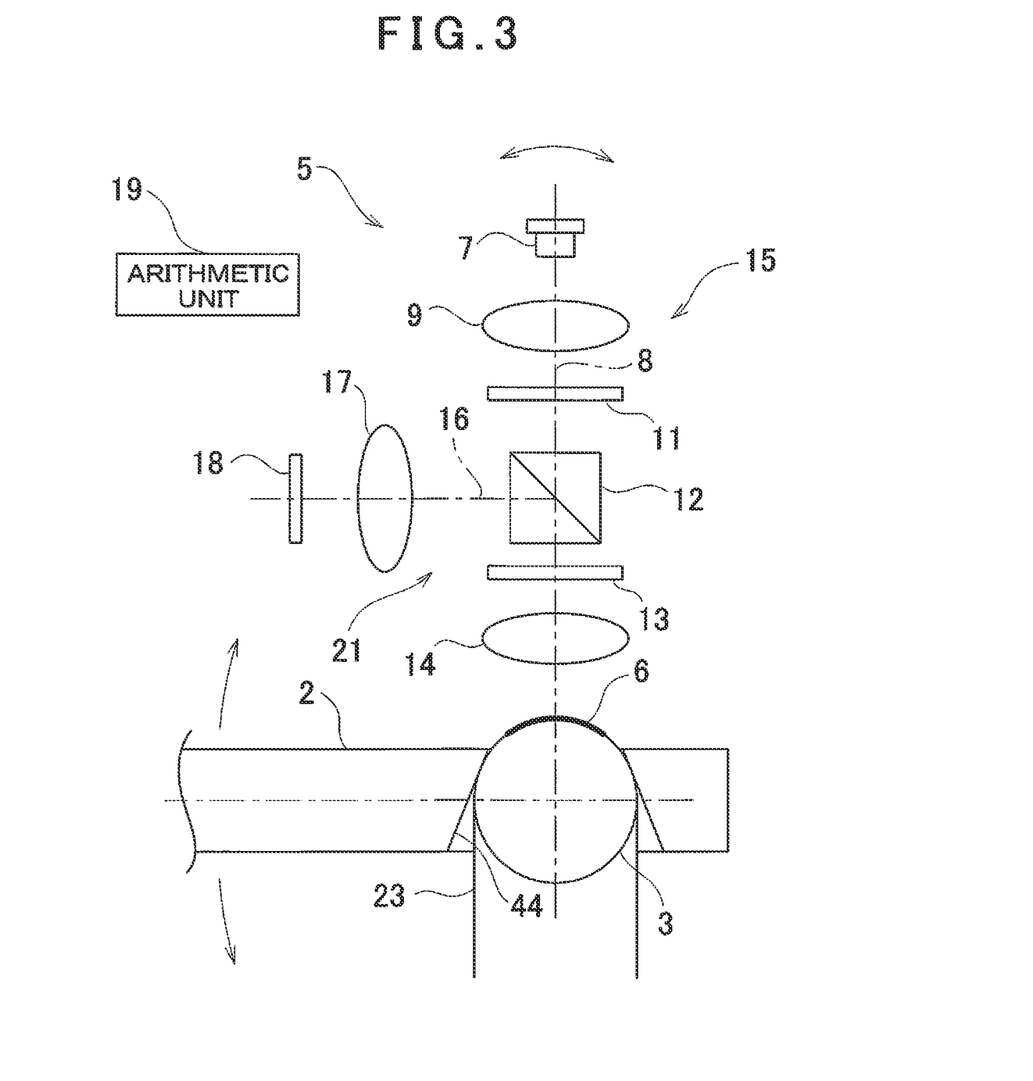
FIG. 3 is a schematical block diagram which show a tilt detecting device according to a second embodiment of the present invention.

FIG. 3 shows a tilt detecting device according to a second embodiment of the present invention. In FIG. 3, what are equivalent to components as shown in FIG. 1 are referred by the same symbol, and detailed description thereof will be omitted.

In the tilt detecting device as shown. In FIG. 3, a pivot member 3 is provided on a fixed side. The pivot member 3 is integrated with a supporting pole 23 as a fixed member. A tilting plate 2 is capable of relatively rotating around the pivot member 3 as a supporting point in two horizontal directions with respect to the pivot member 3.

A tilt detecting unit 5 is provided on the tilting plate 2 side, and the tilting plate 2 and the tilt detecting unit 5 are integrated with each other. Therefore, the tilt detecting unit 5 is provided so as to be able to relatively rotate with respect to the pivot member 3. By tilting the tilting plate 2, she tilting plate 2 and the tilt detecting unit 5 integrally tilt with respect to the pivot member 3.

An angle detection pattern 6 is formed on the pivot member 3. Further, when the tilting plate 2 relatively rotates with respect to the fixed member, the pivot member 3 relatively rotates with respect to the tilt detecting unit 5, which is the same as the first embodiment. Since the tilting plate 2 and the tilt detecting unit 5 tilt integrally, the angle detection pattern 6 relatively rotates and is relatively displaced with respect to the tilt detecting unit 5.

Similarly to FIG. 1, the illumination light is projected to the angle detection pattern 6 from a light source 7 through a projecting optical system 15. A pattern image of the angle detection pattern 6 is projected onto a photodetection element 18 through a photodetection optical system 21.

Therefore, the angle detection pattern 6 is displaced with respect to the photodetection element 18. Further, based on a displacement of the angle detection pattern 6 with respect to the photodetection element 18, a tilt of the tilting plate 2 can be detected.

When a driving unit for tilting the tilting plate 2 is provided on a movable part, i.e. the tilting plate 2, the tilting plate 2 can be tilted at an arbitrary tilt angle by the driving unit based on a tilt detection result of the tilt detecting device.

Figure 4:
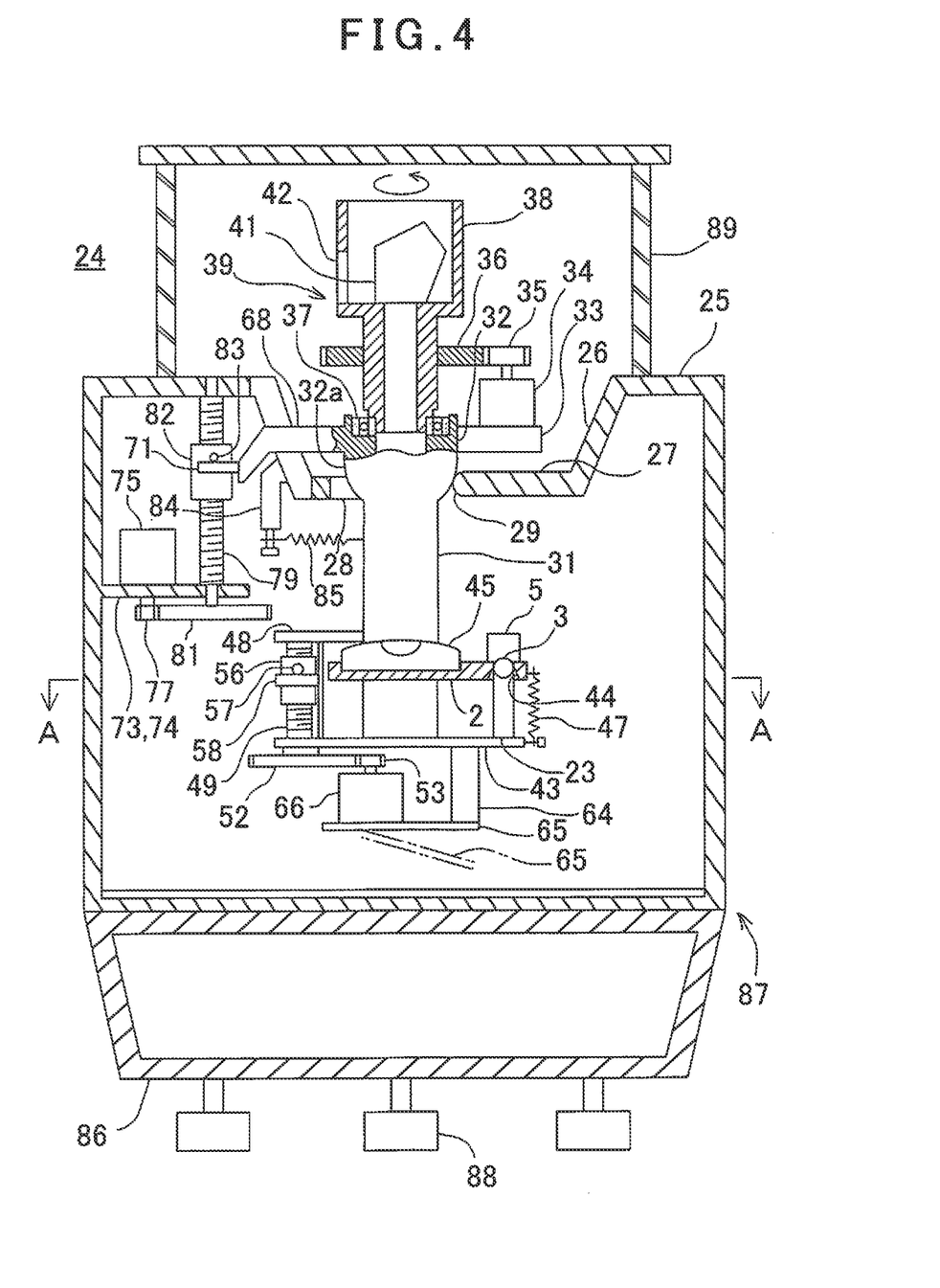
FIG. 4 is one example of a rotary laser apparatus to which the tilt detecting device according the embodiment of the present invention is applied.
Figure 5:
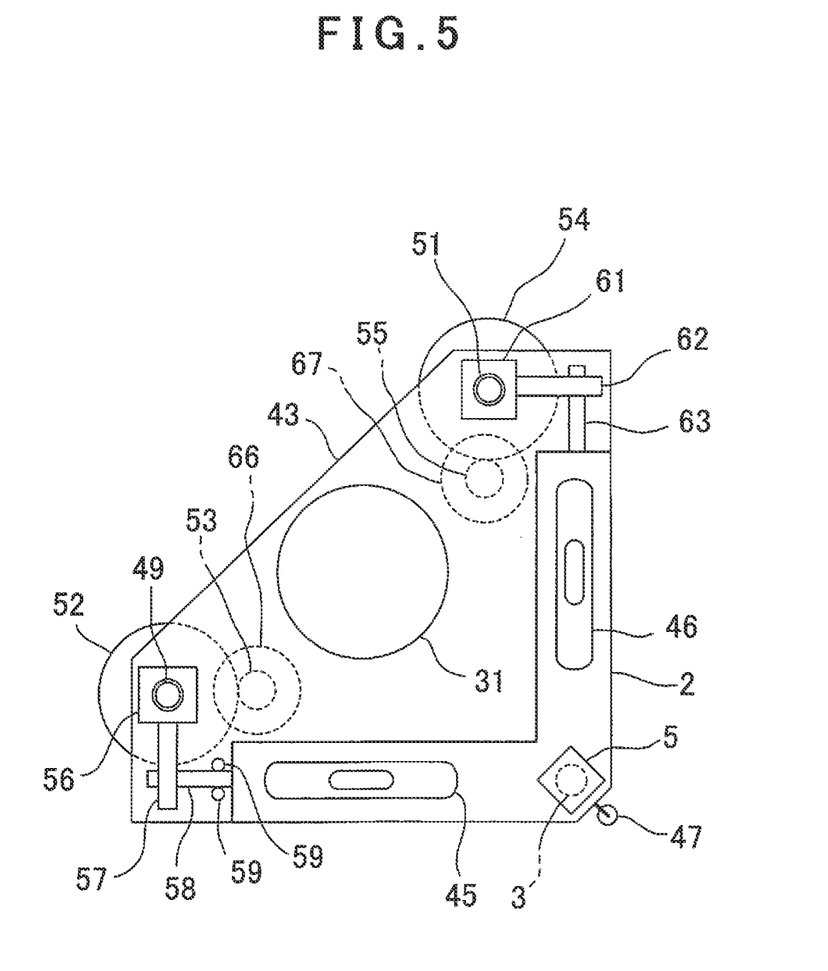
FIG. 5 is an arrow view along line A-A in FIG. 4.

Referring to FIG. 4 and FIG. 5, a description will be given on one example of a surveying instrument to which she tilt detecting device is applied. In FIG. 4 and FIG. 5, what are equivalent to components as shown in FIG. 3 are referred by the same symbol, and detailed description thereof will be omitted. Further, in the description as given below, a rotary laser apparatus 24 will be exemplified as a surveying instrument, and the description will be given on a case where the tilt detecting device is provided on a tilt setting unit of the rotary laser apparatus 24.

In the rotary laser apparatus 24, a tilting plate 2 is a movable part and a tilt detecting unit 5 is provided on the tilting plate 2.

A concave portion 26 with a truncated conical shape is formed at a center of a casing 25 and a support seat 27 is formed at a center of the concave portion 26. The support seat 27 is provided by forming a circular through-hole 28 in the concave portion 26 and forming smoothly raised protuberances 29 at respective positions trisecting an inner periphery of the through-hole 28.

A laser projector 31 which emits an illumination light is inserted into the through-hole 28, and a head portion 32 of the laser projector 31 is supported by the support seat 27. A lower portion of the head portion 32 is a spherical surface portion 32a formed into a spherical surface shape, and the laser projector 31 is tiltably supported with respect to a perpendicular when the spherical surface portion 32a slidably abuts on the protrusion 29.

A motor seat 33 extending in the horizontal direction is provided on the head portion 32 and a scanning motor 34 is mounted on the motor seat 33. A gear 35 is fitted into an output shaft of the scanning motor 34 and the gear 35 meshes with a scanning gear 36 (to be described later).

A prism holder 38 is rotatably provided on the head portion 32 via a bearing 37 and an axis of the prism holder 38 coincides with an axis of the laser projector 31. The scanning gear 36 is fitted into the prism holder 38 and the scanning gear 36 meshes with the gear 35. It is arranged so that the prism holder 38 can rotate with a vertical shaft center as a center by the scanning motor 34 and a rotating unit 39 is constituted by the prism holder 38, the scanning gear 36, and the like. Further, a pentagonal prism 41 is provided in the prism holder 38, and the pentagonal prism 41 is adapted to deflect and emit the illumination light emitted from the laser projector 31 in a horizontal direction through a projection window 42.

Further, a base plate 43 is fixed to a lower end of the laser projector 31. The base plate 43 has an approximately right-angled triangular shape and is orthogonal to the axis of the laser projector 31. The supporting pole 23 is erected near a right-angled top portion of the base plate 43 and the pivot member 3 is fixed to an upper end of the supporting pole 23.

The tilting plate 2 with a right-angled L-shaped form is arranged on an upper part of the base plate 43 and a conical spherical surface seat 44 is formed on an L-shaped top portion on the back side of the tilting plate 2. The pivot member 3 is fitted on the spherical surface seat 44, and the supporting pole 23 supports the top portion of the tilting plate 2 via the pivot member 3. The tilting plate 2 is capable of pivot-movement with the pivot member 3 as the center.

Further, the tilt detecting unit 5 is provided immediately above the pivot member 3 of the tilting plate 2. The tilt detecting unit 5 tilts integrally with the tilting plate 2, and is adapted to relatively tilt with respect to the angle detection pattern 6 as formed on an upper surface of the pivot member 3.

Further, bubble tubes 45 and 46 which are tilt detectors which detect the horzontality are provided on the tilting plate 2 so as to cross each other at a right angle. The bubble tubes 45 and 46 are capacitance detection type electric bubble tubes and configured to output electric signals corresponding to tilt angles with reference to a horizontal plane.

The base plate 43, the tilting plate 2, the tilt detecting unit 5, the bubble tubes 45 and 46 and the angle detection pattern 6 make up a tilt setting unit.

Further, a spring 47 is provided between the tilting plate 2 and the base plate 43, presses the spherical surface seat 44 to the pivot member 3 and biases the tilting plate 2 in a clockwise direction in FIG. 3.

A bearing plate 48 is disposed in a middle portion of the laser projector 31 and the bearing plate 48 extends from the laser projector 31 in the horizontal direction. At positions forming a triangle which has the supporting pole 23 of the base plate 43 as a vertex, tilting screws 49 and 51 are rotatably erected. The upper ends of the tilting screws 49 and 51 are rotatably supported by the bearing plate 48, respectively.

A lower end portion of the tilting screw 49 protrudes downward from the base plate 43. A tilting gear 52 is fitted into the protruding lower end portion of the tilting screw 49 and the tilting gear 52 meshes with a tilting gear 53 to be described later. Similarly, a lower end portion of the tilting screw 51 protrudes downward from the base plate 43. A tilting gear 54 is fitted into the protruding end portion of the tilting screw 51 and the tilting gear 54 meshes with a tilting gear 55 to be described later.

A tilting nut 56 is screwed to the tilting screw 49 and on the tilting nut 56, a nut pin 57 with a circular-shaped cross section is provided to protrude in a horizontal direction. A tilting pin 58 is provided to protrude from an end face of the tilting plate 2 on the tilting screw 49 side and the tilting pin 58 abuts on the nut pin 57. Further, two parallel guide pins 59 are stretched over between the base plate 43 and the bearing plate 48. The guide pins 59 slidably sandwich the tilting pin 58 and restrict a rotation of the tilting plate 2 in the horizontal direction, and the guide pins 59 allow the rotation of the tilting pin 58 in an up-and-down direction and around an axis of the tilting pin 58 as a center.

Further, a tilting nut 61 is screwed to the tilting screw 51 and a nut pin 62 with a circular-shaped cross section is provided to protrude on the tilting nut 61. A tilting pin 63 is provided to protrude from an end face of the tilting plate 2 on the tilting screw 51 side and the tilting pin 63 abuts on the nut pin 62.

A leg pillar 64 is provided on a lower surface of the base plate 43 in a suspending manner, and a motor base 65 is fixed via the leg pillar 64. Tilt angle setting motors 66 and 67 as pulse motors are provided on an upper surface of the motor base 65. The tilting gear 53 is fitted and fixed on an output shaft of the tilt angle setting motor 66, the tilting gear 55 is fitted and fixed on an output shaft of the tilt angle setting motor 67, and the tilting gears 53 and 55 are meshed with the tilting gears 52 and 54, respectively.

Next, a description will be given on a tilting unit which tilts the laser projector 31.

Tilting arms 68 and 69 are orthogonally extended in a horizontal direction from the head portion 32 of the laser projector 31. It is to be noted that in FIG. 4, the tilting arm 68 alone is shown and the illustration of the tilting arm 69 is omitted. The tilting arms 68 and 69 pierce through a conical surface of the concave portion 26, are positioned in the casing 25, and have engaging pins 71 and 72 provided to protrude on forward ends. It is to be noted that, in FIG. 4, the engaging pin 71 alone is shown and the illustration of the engaging pin 72 is omitted.

Each of the engaging pins 71 and 72 is formed into a cylindrical shape and a positional relationship is determined in such a manner that axes of the engaging pins 71 and 72 are orthogonal to each other and included in a plane running through a center of the spherical surface portion 32a. Further, either one of the engaging pins 71 and 72, e.g. regarding the engaging pin 71, a movement in a horizontal direction is restricted and can move only in an up-and-down direction.

Shelf boards 73 and 74 are provided on an inner wall of the casing 25, a tilt motor 75 is provided on the shelf board 73 and a tilt motor 76 (not shown) is provided on the shelf board 74. Further, a driving gear 77 is fitted and fixed on a rotary shaft of the tilt motor 75 and a driving gear 78 (not shown) is fitted and fixed on a rotary shaft of the tilt motor 76.

A screw shaft 79 orthogonal to the engaging pin 71 is mounted between a ceiling portion of the casing 25 and the shelf board 73. A driven gear 81 is fitted into the screw shaft 79 and the driving gear 77 meshes with the driven gear 81. A slide nut 82 is screwed to the screw shaft 79, a pin 83 is provided to the slide nut 82 in protruding state, and the pin 83 and the engaging pin 71 are slidably abutted.

Similarly, a screw shaft (not shown) orthogonal to the engaging pin 72 is mounted between the ceiling portion of the casing 25 and the shelf board 74 and a driven gear (not shown) as meshed with the driving gear 78 is fitted into the screw shaft. Further, a slide nut (not shown) having a pin (not shown) provided to protrude is screwed to the screw shaft and the pin and the engaging pin 72 are slidably abutted.

A spring peg 84 is provided between the ceiling portion of the casing 25 and the two screw shafts and a spring 85 is provided in a tensioned state between the spring peg 84 and the laser projector 31. The spring 85 biases the laser projector 31 in a clockwise direction with the support seat 27 as a center in FIG. 4.

In FIG. 4, reference numeral 86 denotes a battery box which accommodates a battery for driving the rotary laser apparatus 24. Further, a main body 87 of the rotary laser apparatus 24 as described above is provided on a tripod (not shown) via a leveling bolt 88. Further, reference numeral 89 denotes a glass window which surrounds a periphery of the prism holder 38.

Next, a description will be given as to a case where, in the rotary laser apparatus 24, a projecting direction of the illumination light emitted from the laser projector 31 is tilted.

First, a relative tilt between the tilting plate 2 and the base plate 43 is set to be 0 based on a detection result of the tilt detecting unit 5. That is, the tilting plate 2 and the base plate 43 are set to be parallel. At this time, a projecting position of a pattern image as obtained by the illumination light, which is emitted from the light source 7 of the tilt detecting unit 5 and reflected by the angle detection pattern 6, is an origin point, e.g. the center, of the photodetection element 18. The axis of the laser projector 31 is orthogonal to the tilting plate 2.

Next, the tilt motors 75 and 76 are driven based on the detection results of the bubble tubes 45 and 46 and the laser projector 31 is tilted. By tilting the laser projector 31, the bubble tubes 45 and 46 are in a condition where the horizontality can be detected and the leveling of the laser projector 31 is carried out. In this condition, the laser projector 31 becomes vertical (the axis of the laser projector 31 is vertical).

After the leveling of the laser projector 31, the tilting plate 2 is tilted based on an inputted tilt value. For instance, the tilt angle setting motor 66 is driven with number of steps corresponding to the tilt value and the tilting plate 2 is tilted at an angle as desired in a direction opposite to a direction in which the laser projector 31 is to be tilted. By tilting the tilting plate 2, the tilt detecting unit 5 relatively rotates with respect to the pivot member 3. Therefore, the pattern image projected on the photodetection element 18 moves and a tilt angle of the tilting plate 2 can be detected based on a position of the pattern image.

After tilting the tilting plate 2, the tilt motor 75 is driven and the laser projector 31 is tilted in the direction in which the laser projector 31 is to be tilted until the bubble tubes 45 and 46 detect the horizontality. At this time, since the tilt detecting unit 5 and the pivot member 3 tilt integrally, a tilt detecting result of the tilting plate 2 provided by the tilt detecting unit 5 is maintained.

When the bubble tubes 45 and 46 detect the horizontality, the tilt setting of the laser projector 31 is completed and the tilt setting in the projecting direction of the illumination light is completed. In this condition, by rotating the pentagonal prism 41 by the scanning motor 34 via the prism holder 38, a reference plane tilted in a predetermined direction at an angle as desired can be formed.

As described above, in this embodiment, the angle detection pattern 6 is formed on the pivot member 3 which serves as a supporting point when the tilting plate 2 tilts and a tilt angle of the tilting plate 2 can be detected based on a relative moving amount of the angle detection pattern 6 with respect to the tilt detecting device.

Therefore, the moving amount of the angle detection pattern 6 is considerably smaller than a moving amount of a forward end side of the tilting plate 2. As a result, compared with a case where the moving amount of the tilting plate 2 is detected directly, the photodetection element 18 for receiving the pattern image of the angle detection pattern 6 can be decreased in size and manufacturing costs can be reduced.

Further, in the present embodiment, since the tilt angle of the tilting plate 2 is detected based on a projecting position of the pattern image of the angle detection pattern 6, a size of a device does not have to be increased for higher accuracy such as a conventional encoder. Therefore, the tilt detecting device can be miniaturized and the tilt can be detected highly accurately.

Further, in the present embodiment, the angle detection pattern 6 is formed on the pivot, member 3 by printing, engraving and exposure, or the like, and a photodetecting position on the photodetection element 18 of the pattern image reflected by the angle detection pattern 6 is merely detected. Therefore, there is no need to additionally provide a mechanism for detecting and number of components can be reduced.

Further, in the present embodiment, the angle detection pattern 6 is formed on a spherical object by printing, engraving, or the like. Therefore, when an environmental temperature varies, the expansion and contraction become approximately point-symmetrical and an error can be minimized.

Further, in the present embodiment, the polarizing plate 11 and the quarter-wave plate 13 constitute an optical isolator. Therefore, the reflection light in a specific polarizing direction alone is received by the photodetection element 18, a reduction in light amount can be suppressed, the pattern image can be detected with a sufficient light amount and a tilt detecting accuracy of the tilt detecting device, can be further improved.

Further, in the present embodiment, the pattern image reflected by the angle detection pattern 6 is totally reflected by the polarizing beam splitter 12. Therefore, the pattern image is not transmitted through the polarizing beam splitter 12 and does not reach the light source 7 side, the illumination light from the light, source 7 is not received by the photodetection element 18 and the operation of the tilt detecting device can be stabilized.

Further, in the present embodiment, the condenser lens 14 is provided on the projection optical axis 8, and the illumination light, which is turned to a parallel luminous flux by the projection lens 9, can be condensed with respect to the angle detection pattern 6. Therefore, even in a case where the light intensity is decreased in a process of passing through the polarizing plate 11, the pattern image of the angle detection pattern 6 having a sufficient light intensity can be projected to the photodetection element 18.

It is to be noted that, in the present embodiment, the polarizing plate 11 and the quarter-wave plate 13 are provided on the projection optical axis 8 and the polarizing plate 11 and the quarter-wave plate 13 constitute the optical isolator, but it may be so arranged that a polarizing film with a polarization characteristic of transmitting a light which is a P-polarized light alone, for instance, may be vapor-deposited on an incident surface of the polarizing beam splitter 12, a quarter-wave film may be vapor-deposited on an exit surface of the polarizing beam splitter 12 and the polarizing beam splitter 12 alone may constitute the optical isolator. In this case, the polarizing plate 11 and the quarter-wave plate 13 can be omitted and the tilt detecting device can be further miniaturized.

Further, if an S/N ratio does not become a problem, the optical isolator can be omitted.

The invention claimed is:

1. A tilt detecting device, in which a fixed member and a tilting plate are relatively rotatably provided via a sphere, either one of said fixed member or said tilting plate is integral with said sphere, a hole which makes up a spherical seat and is provided on the other one of said fixed member or said tilting plate and rotatably fitted on said sphere, wherein a portion of said sphere is exposed through the hole;

comprising a tilt detecting unit provided on either of said fixed member or said tilting plate which relatively rotates with respect to said sphere, and an angle detection pattern formed on a surface of the exposed portion of said sphere, wherein said sphere is rotatably supported in an X direction and a Y direction with respect to said spherical seat around a center point of said sphere as a center, wherein said tilt detecting unit comprises a light source for projecting an illumination light to the exposed portion of said sphere, a photodetection element having pixels arranged in a matrix fashion, for receiving the illumination light reflected by said sphere and for outputting a photodetecting position of said pattern as a photodetection signal, based on a photodetection information from said pixels, and an optical system for projecting a pattern image to said photodetection element, wherein said photodetecting position of said pattern image changes based on a tilt between said fixed member and said tilting plate when said sphere rotates.

2. A tilt detecting device according to claim 1, wherein said optical system comprises a polarizing plate disposed on an optical axis, a polarizing beam splitter and a quarter-wave plate, wherein the illumination light is projected to said sphere via said polarizing plate, said polarizing beam splitter and said quarter-wave plate, and said pattern image reflected by said sphere is received by said photodetection element via said quarter-wave plate and said polarizing beam splitter.

3. A tilt detecting device according to claim 2, wherein said polarizing plate is a polarizing film formed on an incident surface of said polarizing beam splitter and said quarter-wave plate is a quarter-wave film formed on an exit surface of said polarizing beam splitter.

4. A rotary laser apparatus comprising a laser projector tiltably provided, deflecting a laser beam in a horizontal direction and projecting in rotary irradiation, a tilting unit for tilting said laser projector, and a tilt setting unit for setting a target tilt angle of said laser projector, wherein said tilt setting unit comprises a base plate orthogonal to an axis of said laser projector, a tilting plate provided tiltably with respect to said base plate via a sphere, a tilt detector provided on said tilting plate for detecting a horizontality of said tilting plate, an angle detection pattern formed on said sphere, and said tilt detecting unit as described in claim 1 provided on said tilting plate.

* * * * *